July 20, 1954  W. C. OFFUTT  2,684,389
ALKYLATION OF PHENOLS
Filed Nov. 3, 1950
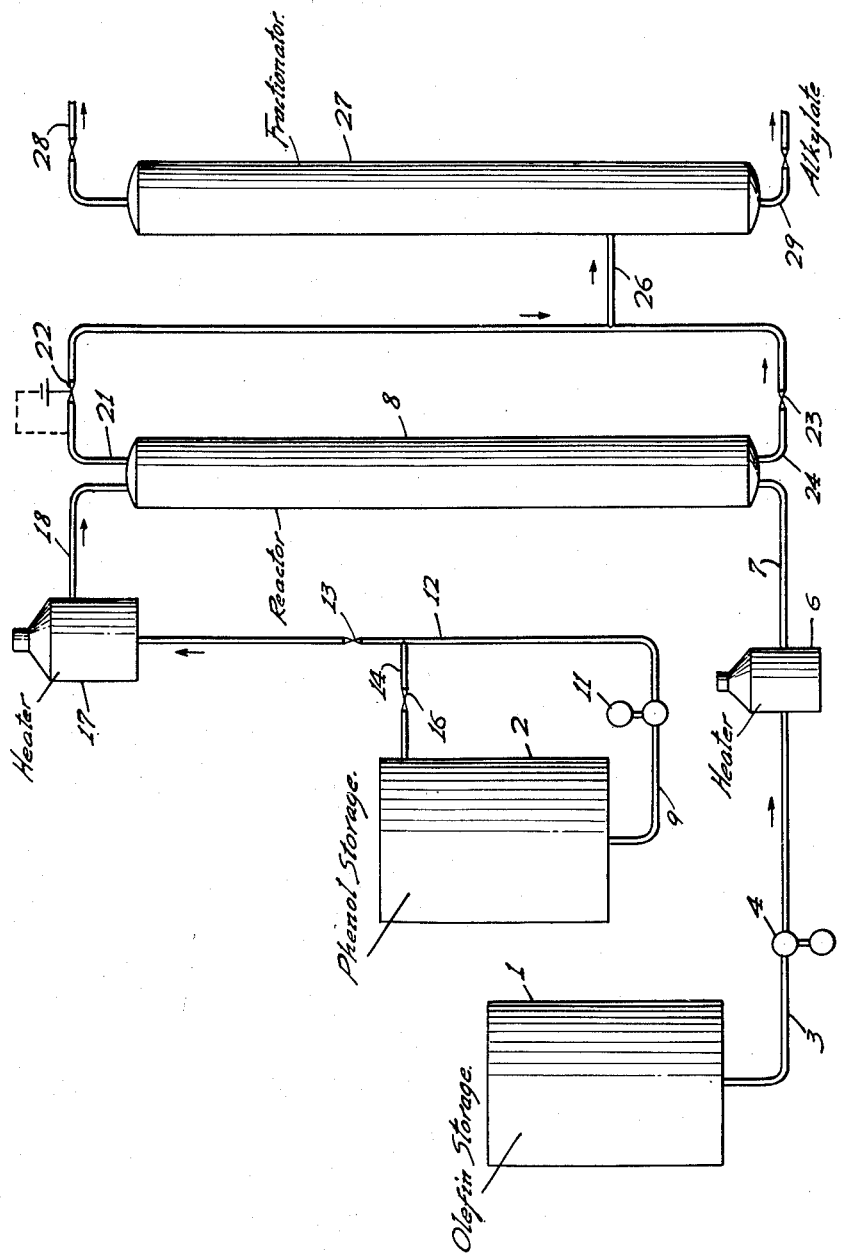
INVENTOR.
William C. Offutt.
BY
his ATTORNEY:-

Patented July 20, 1954

2,684,389

UNITED STATES PATENT OFFICE 2,684,389

ALKYLATION OF PHENOLS

William C. Offutt, Edgewood, Pa., assignor to Gulf Research & Development Company, Pittsburgh, Pa., a corporation of Delaware Application November 3, 1950, Serial No. 193,940

9 Claims. (Cl. 260—624)

This invention relates to the alkylation of phenols with olefins, and more particularly to the continuous alkylation of a cresol with isobutylene to produce a mono-tertiary-butyl cresol and a ditertiary-butyl cresol.

I have discovered in accordance with the invention that phenols can be efficiently alkylated with mono-olefins to produce the corresponding alkyl phenols by a process comprising flowing the olefin in vapor phase upwardly through a solid bed of natural or synthetic silica-alumina absorbent catalyst while simultaneously flowing the phenol in liquid phase downwardly through the bed of catalyst. I have found that in carrying out this process, if the desired alkylation products are to be obtained in yields of practical importance, the reaction temperature should be maintained within the range of about 250° to about 350° F.

The phenol subjected to alkylation can be phenol itself or mono-alkylated phenols such as meta-cresol, para-cresol, ethyl phenol, propyl phenol, tertiary butyl phenol, higher mono-alkyl phenols, naphthols, and methyl, ethyl, propyl, butyl and higher alkyl naphthols. I have discovered that the process is not adapted to accomplish alkylation of phenols containing more than one alkyl group. Thus, if a mono-tertiarybutyl cresol is charged to the process, substantial alkylation does not occur and therefore the product does not contain a substantial amount of ditertiary-butyl cresol. This is somewhat surprising because when alkylating a cresol with a mono-olefin such as isobutylene, the product obtained, while containing a larger proportion of mono-alkyl cresol, does contain a substantial proportion of di-alkyl cresol.

Any mono-olefin capable of existing at least partly in vapor phase under the conditions of the process can be employed for reaction with a phenol. Especially efficient results are obtained with the use of a mono-olefin having a boiling point below the boiling point of the phenol to be alkylated as in such case a substantial proportion of the olefin charged is reacted with the phenol. As examples of suitable olefins there may be mentioned, for example, mono-olefins containing from 3 to 10 carbon atoms, the olefin to be used in a given case depending primarily, of course, upon the final alkylated product that it is desired to produce. The process is particularly efficient when employed for the alkylation of a phenol with an iso-olefin; i. e., an olefin in which a carbon atom forming part of the olefinic linkage is attached to two additional carbon atoms, which two carbon atoms may each be part of a methyl group or a higher alkyl group. Specific olefins that can be employed are propylene, n-butylene, isobutylene, 1-pentene, 2-pentene, 2-methyl-1-butene, diisobutylene, tripropylene, 1-nonene, decene, and related higher olefins.

When the mono-olefin employed is a relatively high molecular weight material which is not completely in vapor phase under the existing conditions, the process is carried out by using such an amount of the olefin that its vapor pressure is sufficiently high to cause the olefin vapors to pass out of the top of the reactor and accomplish countercurrent flow with the down-flowing phenol. The reaction between the olefin and the phenol takes place largely between the olefin vapors and the liquid phenol. Any phenol or alkylated phenol going overhead and any olefin removed from the bottom of the reactor with the alkylated product can readily be recovered by conventional procedures.

As to the rection pressure, it is desirable to use an elevated pressure as this aids in effecting the reaction. However, the operativeness of the process, as distinguished from its efficiency, is not dependent upon the use of any particular pressure. The pressure should be maintained at such a point that the phenol is at least substantially in liquid phase and a substantial amount of olefin is in vapor phase. I have found that when reacting a phenol with a mono-olefin having a boiling point below the boiling point of the phenol, a pressure of at least 250 pounds per square inch is especially effective. In this case the maximum pressure should be below that at which the olefin is substantially completely in liquid phase under the existing operating conditions, and is preferably below 350 pounds per square inch.

As previously indicated, the catalyst employed in the process is a natural or synthetic silica-alumina adsorbent catalyst. Thus, the catalyst can be a synthetic silica-alumina composite containing a predominant amount of silica and a minor amount of alumina such as is employed in the catalytic cracking of heavy hydrocarbons to produce gasoline hydrocarbons and lighter hydrocarbons, a preferred catalyst of this type being a catalytic cracking composite comprising of the order of twelve per cent alumina by weight, the rest being substantially entirely silica. Catalysts of this class can, if desired, contain a small amount of another metal oxide such as zirconia, titania, manganese oxide, and the like, since such oxides do not appear to have any adverse effect on the reaction and in some cases seem to have an advantageous effect. Other suitable silica-alumina adsorbent catalyst include natural clays, such as non-swelling montmorillonite clays and kaolin clays, fuller's earths, Attapulgus clay, and Floridin earth. An effective catalyst is an acid-activated montmorillonite clay prepared, for example, by acid treating an acid activable non-swelling bentonite. Such an acid-activated clay is employed as a natural silica-alumina cracking catalyst.

The present process has been found to be especially effective when employed for the alkylation of cresols such as a mixture of meta- and para-cresol with isobutylene and therefore the specific description will be concerned primarily with this reaction. In order that the invention may be understood more fully, reference should be made to the drawing accompanying and forming a part of this specification. In the drawing the single figure is a flow sheet or diagrammatical representation of a unit suitable for employment in carrying out the present process.

Referring to the drawing, there is shown an olefin storage vessel 1 containing isobutylene, and a phenol storage vessel 2 containing a mixture of meta-cresol and para-cresol. The isobutylene employed my be substantially pure, but for economic reasons will usually be a C4 refinery cut containing about 12 to 20 mol per cent isobutylene. The mixture of meta- and para-cresol will normally be that obtained in coal tar distillation containing, for example, about 60 per cent by weight meta-cresol and about 40 per cent para-cresol. The isobutylene is continuously removed from the storage vessel 1 through a line 3 by means of a pump 4 at a rate adjusted relative to the rate of withdrawal of the cresol mixture from storage vessel 2 so as to provide about one to four mols of isobutylene to each mol of cresol. The isobutylene cut is then heated in a heater 6 to a temperature within the range of 250° to 350° F. and preferably a temperature of about 300° F. and at this temperature is passed from the heater through line 7 into the bottom of a reactor 8.

At the same time, the cresol mixture is continuously removed from the bottom of storage vessel 2 through line 9 by means of pump 11 and is passed through line 12 controlled by a valve 13. This valve is operated so as to permit the cresols to flow through line 12 at a carefully regulated rate. To aid in accomplishing this regulation, any excess cresols flowing in line 12 are returned to storage vessel 2 through a line 14 controlled by a valve 16. The cresols flowing in line 12 are then passed through a heater 17 where they are heated to the desired reaction temperature within the range referred to above.

The heated cresols are continuously flowed from the heater through line 18 into the top of reactor 8.

The reactor 8 is shown as a cylindrical vessel which is provided with heat exchange means, not shown, adapted to maintain the reactor at the selected reaction temperature. In this embodiment of the process, the reactor contains a bed of a commercial silica-alumina cracking catalyst containing about 12 weight per cent alumina and prepared by a process comprising co-precipitating silica and alumina gels or gelatinous precipitates, drying, base exchanging to remove alkali metal, pelleting, and calcining at a temperature of the order of 1000° to 1200° F. The catalyst is employed in the form of cylindrical pellets ⅛ inch in height by ⅛ inch in diameter.

Under the conditions described, the cresol charge is flowed downwardly over and through the bed of catalyst in liquid phase in contact with the upwardly flowing isobutylene vapors at a rate such that the space velocity (volumes of cresols/volume of catalyst/hour) in the reactor is from about one-quarter to two, preferably about one-half to one, and the alkylation of the cresols is caused to take place. The unreacted gases, including some unreacted isobutylene, are removed overhead through line 21 provided with a pressure control valve 22 which, in cooperation with valve 23 in line 24, is effective to maintain the pressure in the reactor. The alkylated cresols, together with any unreacted cresols and entrained and dissolved gases, flow from the bottom of the reactor through lines 24 and 26 to a fractionator 27. The gases leaving the reactor through line 21 are also introduced into the fractionator through line 26. The fractionator in this case is operated as a debutanizer so as to strip from the alkylation product the excess gases which are removed from the system through valve-controlled line 28. The alkylate is withdrawn from the debutanizer through valve-controlled line 29 and may be passed to storage, but preferably will be additionally fractionated to separate it into its several components.

In order to show the results obtainable in practicing the process of the invention, there are given in the following Table 1 the results obtained in a series of runs carried out in the manner described above. The catalyst employed was a coprecipitated silica-alumina composite as previously described.

| Run | A | B | C | D | E | F | G |
|---|---|---|---|---|---|---|---|
| Operating Conditions: | | | | | | | |
| Ave. Reactor Temp., °F | 222 | 250 | 312 | 354 | 310 | 289 | 261 |
| Ave. Reactor Press., p. s. i. g | 250 | 251 | 251 | 250 | 300 | 250 | 250 |
| Space Velocity (vols. of cresols/vol. catalyst/hr.) | 1.03 | 1.02 | 1.15 | 1.13 | 1.02 | 1.13 | 0.58 |
| Mol Ratio, Isobutylene/Cresol | 2.32 | 2.52 | 2.27 | 3.49 | 1.54 | 12.10 | 2.75 |
| Yields: | | | | | | | |
| Alkylate Analysis, Wt. Percent— | | | | | | | |
| Lights+Diisobutylene | 4.1 | 6.3 | 6.5 | 8.5 | 1.1 | 24.0 | 4.0 |
| Triisobutylene | 0 | 0 | 20.7 | 5.7 | 0 | 13.8 | 0 |
| m,p-Cresol | 84.4 | 26.5 | 11.5 | 30.3 | 44.9 | 36.5 | 48.8 |
| Mono-t-butyl Cresols | 11.5 | 53.2 | 39.6 | 38.8 | 45.1 | 18.7 | 28.7 |
| Di-t-butyl p-Cresol | | | 9.0 | 7.0 | 8.9 | 7.0 | 7.6 |
| Di-t-butyl m-Cresol & Heavier | | 14.0 | 12.7 | 9.7 | | | 10.9 |
| Ratio of Di-t-butyl Cresols/Mono-t-Butyl Cresols, Wt./Wt | | 0.26 | 0.55 | 0.43 | 0.20 | 0.37 | 0.64 |

In each of the runs, except run F, the isobutylene was charged in admixture with other C4 hydrocarbons as in a C4 refinery cut; the isobutylene constituted about 13 to about 17 mol per cent of the C4 charge. The C4 charge to run F contained 97.6 mol per cent isobutylene.

It will be seen from the results given in the table that when operating as described under run A employing an average reaction temperature of 222° F., very little alkylation took place, whereas by using an average reactor temperature of 250° F. as in run B, substantial alkylation was accomplished. When maintaining the space velocity at about 1.0, the operating conditions of run E gave especially good results for, while the conversion to di-t-butyl cresols was not especially high, very little polymerization of isobutylene to diisobutylene and triisobutylene occurred.

Four similar runs were carried out but involving the alkylation of phenol itself with isobutylene. The catalyst was a commercial synthetic silica-alumina catalyst as previously described. The conditions of these runs and the results obtained are given in the following table.

| Run | H | I | J | K |
|---|---|---|---|---|
| Operating Conditions: | | | | |
| Ave. Reactor Temp., ° F | 322 | 303 | 258 | 278 |
| Ave. Reactor Press., p. s. i. g | 300 | 300 | 250 | 250 |
| Space Velocity (vols. of Phenol/vols. of catalyst/hr.) | 1.42 | 1.05 | 1.02 | 1.02 |
| Mol Ratio, Isobutylene/Phenol | 2.45 | 1.16 | 1.26 | 3.92 |
| Yields: | | | | |
| Alkylate Analysis, Wt. Percent— | | | | |
| Lights+Diisobutylene | 11.5 | 4.2 | 2.9 | 8.7 |
| Triisobutylene | 0 | 0 | 0 | 0 |
| Phenol | 14.0 | 16.3 | 24.7 | 7.8 |
| 2-t-Butyl Phenol | 10.0 | 19.0 | 28.1 | 8.5 |
| 4-t-Butyl Phenol | | 27.5 | 15.8 | 7.0 |
| 2,4 Di-t-Butyl Phenol | 48.5 | 22.1 | 20.2 | 52.5 |
| 2,4,6 Tri-t-Butyl Phenol and Heavier | 16.0 | 10.9 | 8.3 | 15.5 |

In these runs, the isobutylene was charged as part of a mixture of C₄ hydrocarbons comprising about 15 to 17 mol per cent of isobutylene. When it is desired to obtain a high yield of polyalkylated phenols by the process of the invention, it is advantageous to employ a high olefin to phenol mol ratio, as shown by the results obtained in run K.

When alkylating other phenols using the present process the conditions of operation can be substantially the same as described above. For example, effective results are obtained with phenol space velocities of about one-quarter to two and the olefin charge rate is preferably such that, under the existing temperature and pressure, one to four mols of the olefin pass in vapor phase through the reactor for each mol of phenol charged. While lower and higher olefin to phenol mol ratios can be used, in the first case the yields are relatively low and in the latter the increase in yield ordinarily does not outweigh the disadvantages flowing from using the larger amount of the olefins.

From the foregoing it will be seen that by practice of the present process phenol itself and mono-alkylated phenols can be efficiently alkylated with mono-olefins. The process is extremely sensitive to temperature, but excellent results are obtained at temperatures within the relatively low range of about 250° to about 350° F. The process has the advantages of producing mono-alkylated and di-alkylated phenols with little production of heavier products. Also, phenol tar formation is slight, and at most only a small amount of the olefin charge is lost in the form of olefin polymers. Moreover, the final alkylated product is ready for use without further chemical treatment as no extraneous materials are introduced into the product during its formation.

Obviously many modifications and variations of the invention may be made without departing from the spirit and scope thereof, but only such limitations should be imposed as are indicated in the appended claims.

I claim:

1. A process of alkylating a phenol selected from the group consisting of phenol itself and mono-alkyl phenols with a mono-olefin to obtain a greater yield of a product dialkylated by said olefin which comprises flowing said phenol in liquid phase downwardly in contact with a silica-alumina adsorbent catalyst while flowing vapors of said mono-olefin in an amount so as to provide about two to about four mols of said olefin per mol of said phenol upwardly in contact with said phenol and said catalyst at a temperature within the range of about 250° to about 350° F. and a pressure of about 250 to about 350 pounds per square inch.

2. A process of alkylating a phenol selected from the group consisting of phenol itself and mono-alkyl phenols with a mono-olefin to obtain a greater yield of a product dialkylated by said olefin which comprises flowing said phenol downwardly in liquid phase in contact with a silica-alumina adsorbent cracking catalyst while flowing vapors of said mono-olefin in an amount so as to provide about two to about four mols of said olefin per mol of said phenol upwardly in contact with said phenol and said catalyst at a temperature within the range of about 250° to about 350° F. and a pressure of about 250 to about 350 pounds per square inch.

3. A process in accordance with claim 2 in which the mono-olefin is an iso-olefin.

4. A process in accordance with claim 2 in which the catalyst is a synthetic silica-alumina adsorbent cracking catalyst containing a major amount of silica and a minor amount of alumina.

5. A process of alkylating a phenol selected from the group consisting of phenol itself and mono-alkyl phenols with isobutylene to obtain a greater yield of a product dialkylated by said isobutylene which comprises flowing said phenol in liquid phase downwardly in contact with a silica-alumina adsorbent catalyst while flowing vapors of said isobutylene in an amount so as to provide about two to about four mols of said olefin per mol of said phenol upwardly in contact with said phenol and said catalyst at a temperature within the range of about 250° to about 350° F. and a pressure of about 250 to about 350 pounds per square inch.

6. A process of alkylating phenol with isobutylene to obtain a greater yield of a product dialkylated by said isobutylene which comprises flowing phenol in liquid phase downwardly in contact with a silica-alumina adsorbent catalyst while flowing vapors of isobutylene in an amount so as to provide about two to about four mols of said olefin per mol of said phenol upwardly in contact with said phenol and said catalyst at a temperature within the range of about 250° to about 350° F. and a pressure of at least 250 pounds per square inch but no more than about 350 pounds per square inch.

7. A process of alkylating cresol with isobutylene to obtain a greater yield of a product dialkylated by said isobutylene which comprises flowing said cresol in liquid phase downwardly in contact with a silica-alumina adsorbent catalyst while flowing vapors of isobutylene in an amount so as to provide about two to about four mols of said olefin per mol of said cresol upwardly in contact with said cresol and said catalyst at a temperature within the range of about 250° to about 350° F. and a pressure of at least 250 pounds per square inch but no more than about 350 pounds per square inch.

8. A process of alkylating phenol with a mono-olefin boiling below the boiling point of phenol to obtain a greater yield of a product dialkylated by said olefin which comprises flowing phenol in liquid phase downwardly in contact with a silica-alumina adsorbent cracking catalyst while flowing vapors of said mono-olefin in an amount so as to provide about two to about four mols of said olefin per mol of said phenol upwardly in contact with said phenol and said catalyst at a temperature within the range of about 250° to about 350° F. and a pressure of at least 250 pounds per square inch but no more than about 350 pound per square inch.

9. A process of alkylating cresol with a mono-olefin boiling below the boiling point of said cresol which comprises flowing said cresol to obtain a greater yield of a product dialkylated by said olefin in liquid phase downwardly in contact with a silica-alumina adsorbent catalyst while flowing vapors of said mono-olefin in an amount so as to provide about two to about four mols of said olefin per mol of said cresol upwardly in contact with said phenol and said catalyst at a temperature within the range of about 250° to about 350° F. and a pressure of at least 250 pounds per square inch but no more than about 350 pounds per square inch.

References Cited in the file of this patent

UNITED STATES PATENTS

| Number | Name | Date |
|---|---|---|
| 2,371,550 | Schaad | Mar. 13, 1945 |
| 2,419,599 | Schulze | Apr. 29, 1947 |
| 2,514,419 | Schulze et al. | July 11, 1950 |